United States Patent
Ito et al.

(10) Patent No.: US 7,953,215 B2
(45) Date of Patent: May 31, 2011

(54) ADDRESS INFORMATION-EXCHANGE SYSTEM, COMMUNICATION TERMINAL DEVICE, SERVER APPARATUS, ADDRESS INFORMATION-EXCHANGE METHOD, AND RECORDING MEDIUM

(75) Inventors: Kyoko Ito, Kawasaki (JP); Minoru Maeda, Kawasaki (JP); Yoshio Nishinaga, Kawasaki (JP); Takashi Ueki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1004 days.

(21) Appl. No.: 11/425,402

(22) Filed: Jun. 21, 2006

(65) Prior Publication Data

US 2007/0206756 A1 Sep. 6, 2007

(30) Foreign Application Priority Data

Mar. 3, 2006 (JP) ................................. 2006-058120

(51) Int. Cl.
*H04M 3/42* (2006.01)
(52) U.S. Cl. .................... 379/201.02; 455/567
(58) Field of Classification Search ........................ None
See application file for complete search history.

(56) References Cited

U.S. PATENT DOCUMENTS

| | | | | |
|---|---|---|---|---|
| 2005/0228901 A1* | 10/2005 | Zhao | ............................ | 709/244 |
| 2007/0073808 A1* | 3/2007 | Berrey et al. | ................ | 709/204 |

FOREIGN PATENT DOCUMENTS

| | | |
|---|---|---|
| JP | 2000-209323 | 7/2000 |
| JP | 2002-247182 | 8/2002 |
| JP | 2002-305580 | 10/2002 |
| JP | 2003-052071 | 2/2003 |

OTHER PUBLICATIONS

Japanese Office Action issued Mar. 2, 2010 in corresponding Japanese Patent Application 2006-058120.

* cited by examiner

*Primary Examiner* — Phuoc Doan
(74) *Attorney, Agent, or Firm* — Staas & Halsey LLP

(57) ABSTRACT

The present invention relates to address-information changing and allows for changing automatically address information registered with a communication destination. Upon receiving a change notification transmitted from a communication terminal device including a mobile phone or the like with changed profile information, address information relating to a source-communication terminal device is changed in a destination-communication terminal device including another mobile phone or the like and a response notification indicating a result of the change is transmitted. Subsequently, the communication terminal device with the changed profile information can change the address information of the communication destination and confirm the changing of the address information. Further, the address information can be changed automatically and the changing can be confirmed automatically.

17 Claims, 16 Drawing Sheets

ADDRESS INFORMATION-EXCHANGE SYSTEM, COMMUNICATION TERMINAL DEVICE, SERVER APPARATUS, ADDRESS INFORMATION-EXCHANGE METHOD, AND RECORDING MEDIUM

CROSS-REFERENCE TO RELATED APPLICATIONS

This application is based upon and claims the benefit of priority from the prior Japanese Patent Application No. 2006-58120, filed on Mar. 3, 2006, the entire contents of which are incorporated herein by reference.

BACKGROUND OF THE INVENTION

1. Field of the Invention

The present invention relates to changing of address information of a communication terminal device such as a mobile phone having a communication function and address information including information about a phone number, a mail address, and so forth, and particularly relates to an address information-exchange system, a communication terminal device, a server apparatus, an address information-exchange method, and an address information-exchange program that are adapted to change the address information automatically.

2. Description of the Related Art

The address information including information about the phone number, mail address, and so forth of a communication destination connected to the Internet and/or telephone lines is registered with a database referred to as a telephone book and/or an address book provided in a device, so as to be managed. If the address information is changed, the communication destination is notified of the change through a phone call and/or a notification mail so that the communication destination updates the address information.

A technology relating to the above-described changing of the address information is disclosed in Japanese Unexamined Patent Application Publication No. 2003-52071, for example. Namely, in the case where a mail address is changed, for example, the body of an electronic mail is prepared, and the electronic mail is transmitted to each of a plurality of addresses included in telephone-book data and/or transmission-and-reception mail data at one time (refer to paragraph 0017, FIGS. 1and 4, and so forth). Further, another technology relating to the above-described changing of the address information is disclosed in Japanese Unexamined Patent Application Publication No. 2002-247182. Namely, when the phone number of a mobile phone is changed, a communication destination registered with a memory is notified of message information relating to the changed phone number at a desired time. Further, information about the notification result is produced (refer to paragraphs 0017 and 0018, FIG. 2, and so forth).

Usually, a notification indicating that address information including information about a phone number, a mail address, and so forth is changed is made in the expectation that the address information would be changed in a notification destination. However, it is difficult for the user to know whether or not the address information is updated at the notification destination. Further, if the notification is received in the notification destination, the notification destination may not respond to the notification mail immediately. In such case, the notification destination may forget to update the address information after a while, or neglect to update the address information. If the address information is not updated, the transmission of the notification comes to nothing, and subsequent communications may be hampered.

Each of Japanese Unexamined Patent Application Publication No. 2003-52071 and Japanese Unexamined Patent Application Publication No. 2002-247182 neither discloses nor implies the above-described problems and shows no ideas adapted to solve the above-described problems.

SUMMARY OF THE INVENTION

A first object of the present invention relates to changing of address information. Namely, the first object is to change address information registered with a communication destination automatically.

Further, a second object of the present invention is to easily confirm whether or not the address information of the communication destination is changed.

For achieving the above-described objects, the present invention provides the following technology. Namely, upon receiving a change notification transmitted from a communication terminal device with changed profile information, address information relating to a source-communication terminal device is changed in a destination-communication terminal device and the source-communication terminal transmits a response notification indicating a result of the change. Subsequently, the communication terminal device with the changed profile information can change the address information of the communication destination and confirm whether or not the address information is changed. Thus, the address information can be changed automatically and the change can be confirmed automatically.

For achieving the above-described first and second objects, an address information-exchange system according to a first aspect of the present invention includes a first communication terminal device configured to transmit a change notification indicating that profile information is changed; a second communication terminal device configured to change address information of the first communication terminal device on the basis of the profile information and transmit a response notification about the changed address information; and a server apparatus configured to transmit the change notification of the first communication terminal device to the second communication terminal device, receive the response notification of the second communication terminal device, and transmit the response notification to the first communication terminal device. Subsequently, the above-described objects can be achieved.

For achieving the first object, a communication terminal device according to a second aspect of the present invention includes a profile-information storage unit configured to store profile information; an address information-storage unit configured to store address information about a communication destination; a transmission unit configured to transmit a change notification of address information of the communication destination in case where the profile information is changed; and a transmission-control unit configured to make the transmission unit transmit the change notification of the address information, until a response notification is received, where the response notification relates to changing of the address information of the communication destination. Subsequently, the first object can be achieved.

In the communication terminal device, the transmission-control unit may make the transmission unit transmit the change notification of the address information at predetermined time intervals and/or a predetermined number of times.

The communication terminal device may include a display unit configured to show information, wherein the display unit produces a dialogue screen adapted to ask about time intervals and/or a number of times the change notification is transmitted, so as to receive information about the time intervals and/or the number of times.

For achieving the objects, a communication terminal device according to the present invention includes an address information-storage unit configured to store address information relating to a communication destination; a reception unit configured to receive a change notification indicating that profile information of the communication destination is changed; and an address information-change unit configured to change the address information stored in the address information-storage unit on the basis of the change notification.

The communication terminal device may include a display unit configured to show information, wherein the display unit produces a dialogue screen adapted to ask whether or not the address information should be changed, and wherein it is determined whether or not the address information is changed on the basis of response information to the dialogue screen.

For achieving the above-described first and second objects, a server apparatus according to a third aspect of the present invention includes a reception unit configured to receive a change notification of profile information, where the change notification is transmitted from a first communication terminal device, and/or a response notification transmitted from a second communication terminal device corresponding to the first communication terminal device, where the response notification relates to changing of address information; and a transmission unit configured to transmit the change notification transmitted from the first communication terminal device to the second communication terminal device and/or transmit the response notification transmitted from the second communication terminal device to the first communication terminal device. Subsequently, the first and second objects can be achieved.

The server apparatus may include a storage unit configured to store information indicating whether or not a destination-communication terminal device can change address information in response to the change notification; and a control unit configured to make the transmission unit transmit a response notification to the first communication terminal device on the basis of the information stored in the storage unit upon receiving the change notification transmitted from the first communication terminal device.

For achieving the first object, an address information-exchange method according to a fourth aspect of the present invention includes processing adapted to transmit a change notification of address information of a communication destination in case where profile information is changed; and processing adapted to transmit the change notification of the address information, until a response notification is received, where the response notification relates to changing of the address information of the communication destination. Subsequently, the first object can be achieved.

The address information-exchange method may include processing adapted to determine time intervals and/or number of times the change notification is transmitted; and processing adapted to transmit the change notification of the address information at the determined time intervals and/or the determined number of times.

The address information-exchange method may include processing adapted to produce a dialogue screen adapted to ask about time intervals and/or number of times the change notification is transmitted; and processing adapted to receive information about the time intervals and/or the number of times.

For achieving the objects, an address information-exchange method according to the present invention includes the steps of processing adapted to receive a change notification indicating that profile information of a communication destination is changed; and processing adapted to change address information stored in an address information-storage unit on the basis of the change notification.

The address information-exchange method may include processing adapted to produce a dialogue screen adapted to ask whether or not the address information of the communication destination should be changed, and processing adapted to receive information indicating whether or not the address information is changed on the basis of response information to the dialogue screen.

For achieving the objects, an address information-exchange method according to the present invention includes processing adapted to receive a change notification of profile information, where the change notification is transmitted from a first communication terminal device, and/or a response notification transmitted from a second communication terminal device corresponding to the first communication terminal device, where the response notification relates to changing of address information; and processing adapted to transmit the change notification transmitted from the first communication terminal device to the second communication terminal device and/or transmit the response notification transmitted from the second communication terminal device to the first communication terminal device.

The address information-exchange method may include processing adapted to store information indicating whether or not a destination-communication terminal device can change address information in response to the change notification; and processing adapted to transmit a response notification to the first communication terminal device on the basis of the information indicating whether or not the address information can be changed upon receiving the change notification transmitted from the first communication terminal device.

For achieving the above-described first and second objects, a fifth aspect of the present invention shows an address information-exchange program executed by a computer. The program includes the steps of transmitting a notification relating to changing of address information of a communication destination in case where profile information is changed; and transmitting the change notification of the address information, until a response notification is received, where the response notification relates to the changing of the address information of the communication destination. Subsequently, the above-described first and second objects can be achieved.

The address information-exchange program may include the steps of determining time intervals and/or number of times the change notification is transmitted; and transmitting the change notification of the address information at the determined time intervals and/or the determined number of times.

The address information-exchange program may include the steps of producing a dialogue screen adapted to ask about time intervals and/or number of times the change notification is transmitted; and receiving information about the time intervals and/or the number of times.

For achieving the objects, the present invention shows an address information-exchange program executed by a computer. The program includes the steps of receiving a change notification indicating that profile information of a communication destination is changed; and changing address information stored in an address information-storage unit on the basis of the change notification.

The address information-exchange program may include the steps of producing a dialogue screen adapted to ask whether or not the address information of the communication destination should be changed, and receiving information indicating whether or not the address information is changed on the basis of response information to the dialogue screen.

For achieving the objects, the present invention shows an address information-exchange program executed by a computer. The program includes processing adapted to receive a change notification of profile information, where the change notification is transmitted from a first communication terminal device, and/or a response notification transmitted from a second communication terminal device corresponding to the first communication terminal device, where the response notification relates to changing of address information; and processing adapted to transmit the change notification transmitted from the first communication terminal device to the second communication terminal device and/or transmit the response notification transmitted from the second communication terminal device to the first communication terminal device.

The address information-exchange program may include the steps of storing information indicating whether or not a destination-communication terminal device can change address information in response to the change notification; and transmitting a response notification to the first communication terminal device on the basis of the information indicating whether or not the address information can be changed upon receiving the change notification transmitted from the first communication terminal device.

The characteristics and advantages of the present invention will be described, as below.

(1) Address information registered with a communication destination can be changed automatically upon receiving a notification indicating that profile information is changed.

(2) A notification indicating a result of the change of address information is transmitted from the communication destination where the address information is changed. Subsequently, the change of address information can be confirmed easily.

(3) A notification indicating the change of address information can be made easily and the change of address information can be prevented from being revealed.

Other objects, characteristics, and advantages of the present invention will be clearly described with reference to the attached drawings and embodiments of the present invention.

DESCRIPTION OF THE PREFERRED EMBODIMENTS

First Embodiment

Figure 1:
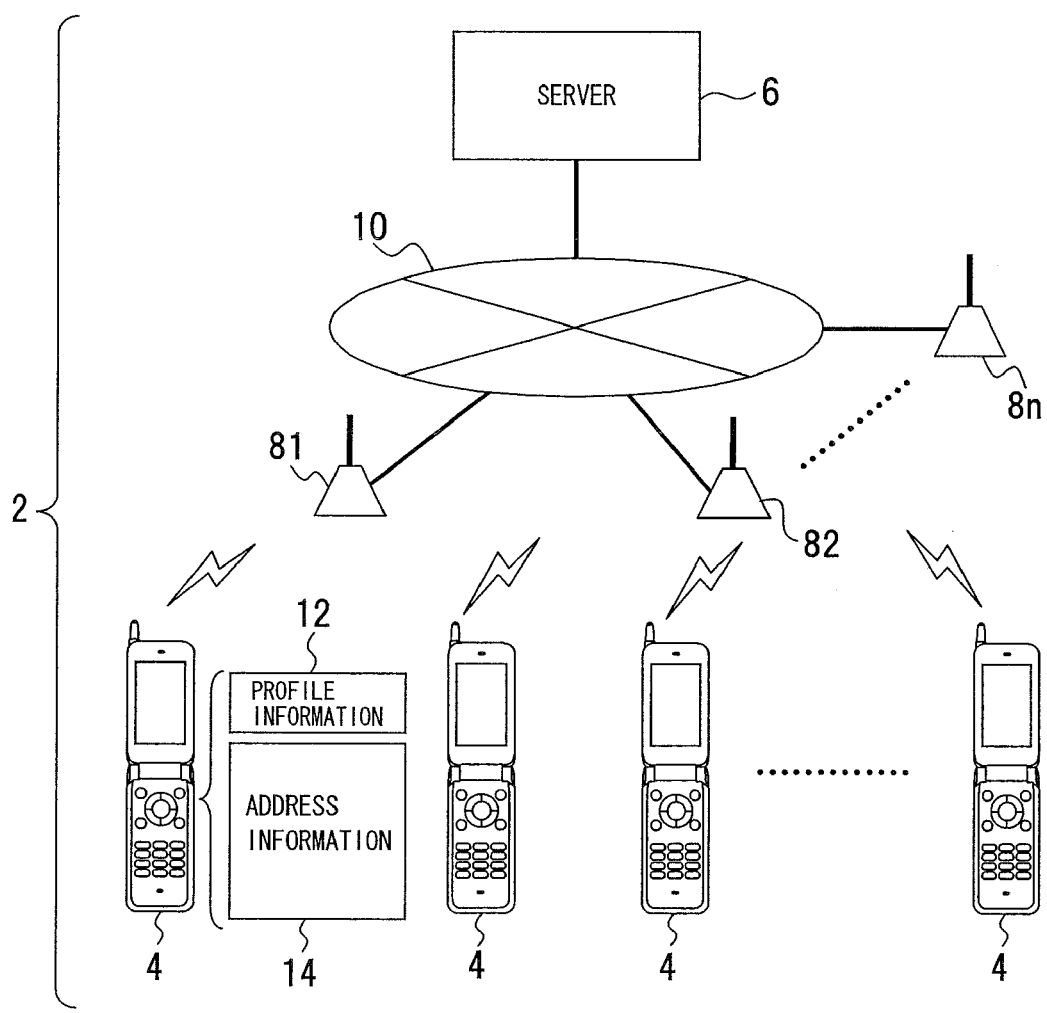
FIG. 1 shows an address information-exchange system according to a first embodiment of the present invention.
Figure 2:
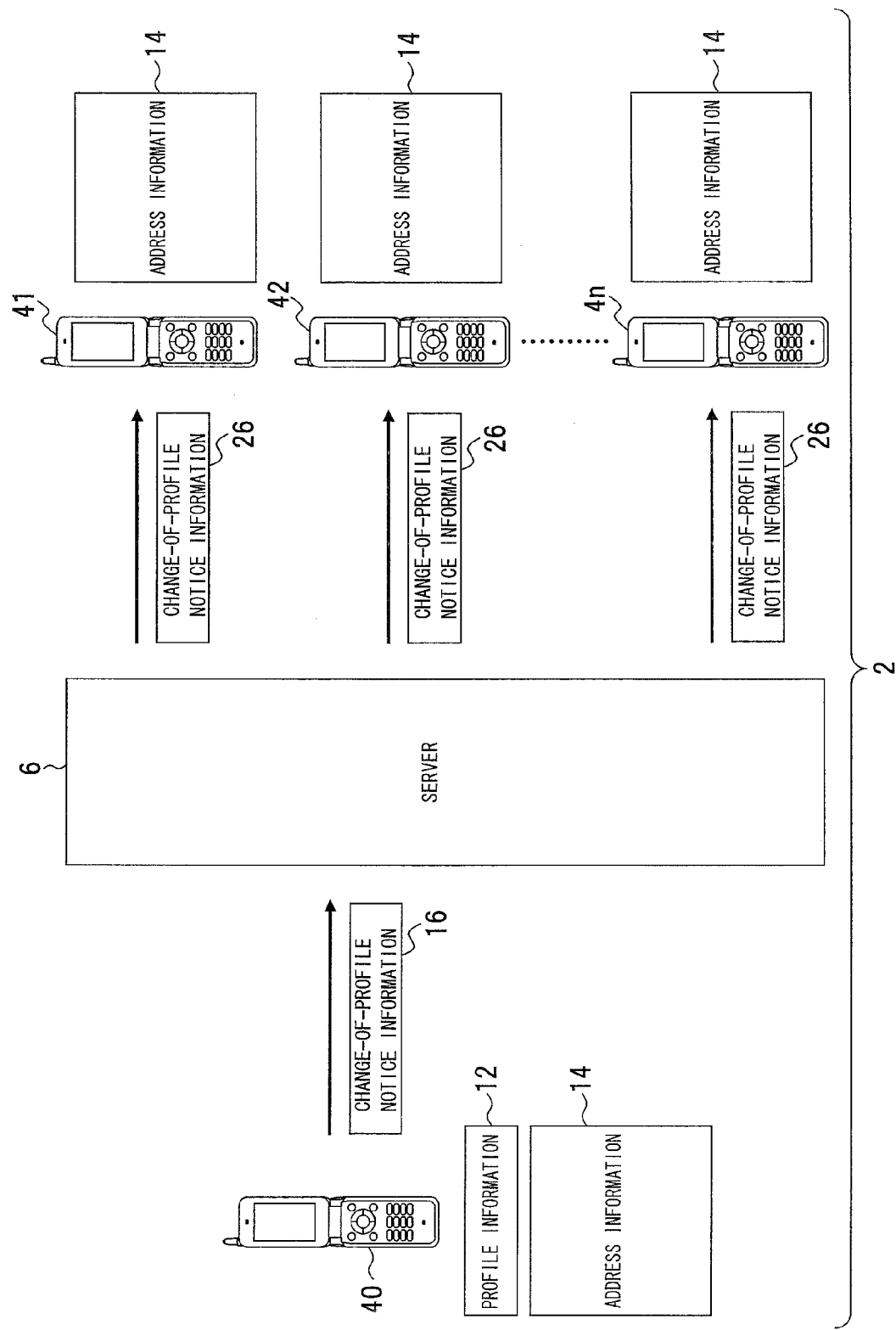
FIG. 2 shows the details on processing procedures performed in the address information-exchange system.
Figure 3:
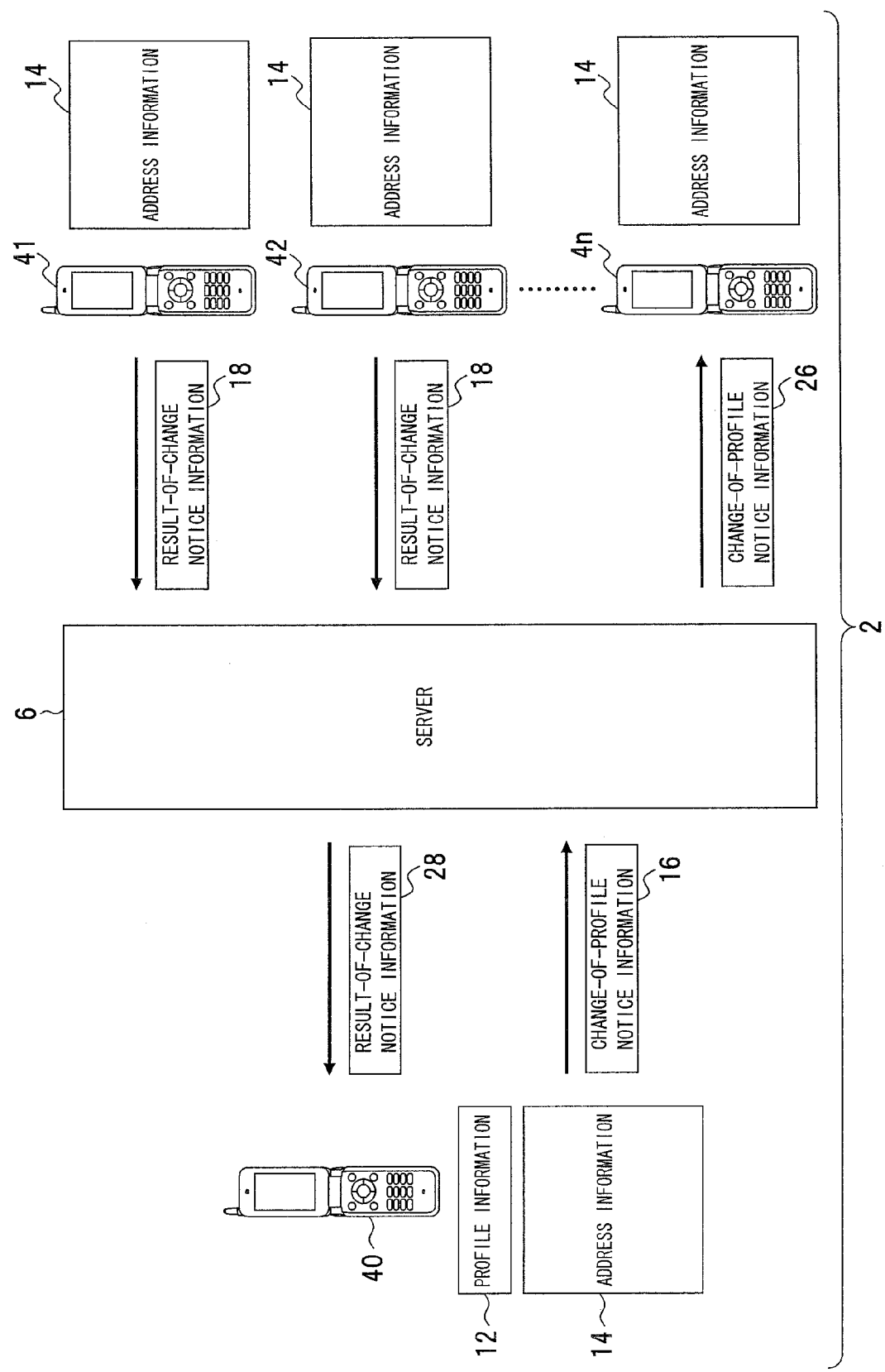
FIG. 3 also shows the details on the processing procedures performed in the address information-exchange system.

A first embodiment of the present invention will be described with reference to FIGS. 1, 2, and 3. FIG. 1 shows an example of an address information-exchange system, FIG. 2 shows processing procedures adapted to transmit a profile information-change notification, and FIG. 3 shows processing procedures relating to the result of changing of address information.

An address information-exchange system 2 is configured to automatically exchange address information including phone-number information, mail-address information, and so forth, where the address information is registered with a telephone book or the like provided in a communication terminal device such as a mobile phone.

The address information-exchange system 2 includes a plurality of mobile phones 4 provided, as radio-communication terminal devices, and a server 6 provided, as a transit unit configured to exchange information. The mobile phones 4 are connected to a network 10 such as the Internet via base stations 81, 82, . . . , and 8n through radio communications. The server 6 is connected to the network 10 and used, so as to exchange address information including information about the phone number and/or mail address of each of the mobile phones 4, for example.

Profile information 12 and destination-address information 14 are registered with each of the mobile phones 4. The profile information 12 is specific information relating to the profile of each of the mobile phones 4. That is to say, the profile information 12 includes information about the phone number, mail address, and so forth of each of the mobile phones 4, for example. Further, the address information 14, which includes the profile information of a destination terminal, is registered with the telephone book, an address book, and so forth, and managed.

In the address information-exchange system 2 shown in FIG. 2, a mobile phone 40 is determined to be a first communication terminal device whose profile information 12 is changed. The mobile phone 40 transmits change-of-profile notice information 16 relating to the profile information 12 to the server 6. Upon receiving the change-of-profile notice information 16, the server 6 transmits change-of-profile notice information 26 to at least one the second communication terminal device including mobile phones 41 to 4n at the same time, or in time sequence. Here, each of the mobile phones 41 to 4n is a destination terminal of which information is added to the address information 14 of the mobile phone 40. However, each of the mobile phones 41 to 4n may be a destination terminal selected by a user, where notice information relating to the profile information 12 is transmitted to the destination terminal. Upon receiving the change-of-profile notice information 26, each of the mobile phones 41 to 4n is promoted to correct the address information 14 relating to the mobile phone 40.

Then, as shown in FIG. 3, the change-of-profile notice information 26 is transmitted to each of the mobile phones 41 and 42, so that the address information 14 relating to the mobile phone 40 is updated in each of the mobile phones 41 and 42. Further, each of the mobile phones 41 and 42 transmits result-of-change notice information 18 to the server 6, where the result-of-change notice information 18 indicates the updated address information 14. The server 6 transmits the result-of-change notice information 28 corresponding to the result-of-change notice information 18 to the mobile phone 40. Thus, on the occasion of the changed profile information 12, the mobile phone 40 is notified that the address information 14 thereof has been corrected and/or whether or not the address information 14 can be corrected in each of the mobile phones 41 and 42.

Here, if the address information 14 is not corrected in the mobile phone 4n, the change-of-profile notice information 16 is transmitted to the server 6 again so that the server 6 transmits the change-of-profile notice information 26 to the mobile phone 4n, as described above. The transmission of the change-of-profile notice information 16 and the change-of-profile notice information 26 is performed continuously until the server 6 issues the result-of-change notice information 28 on the basis of the result-of-change notice information 18 transmitted from the communication destination. In that case, the mobile phone 40 can be notified that the address information 14 is not corrected in the mobile phone 4n which transmits no result-of-change notice information 18.

If the address information 14 is not corrected, the server 6 may detect the fact that the address information 14 is not corrected and/or determine whether or not the address information 14 can be corrected. Then, the server 6 may transmit notice information about the detection and/or the determination to the mobile phone 40.

Figure 4:
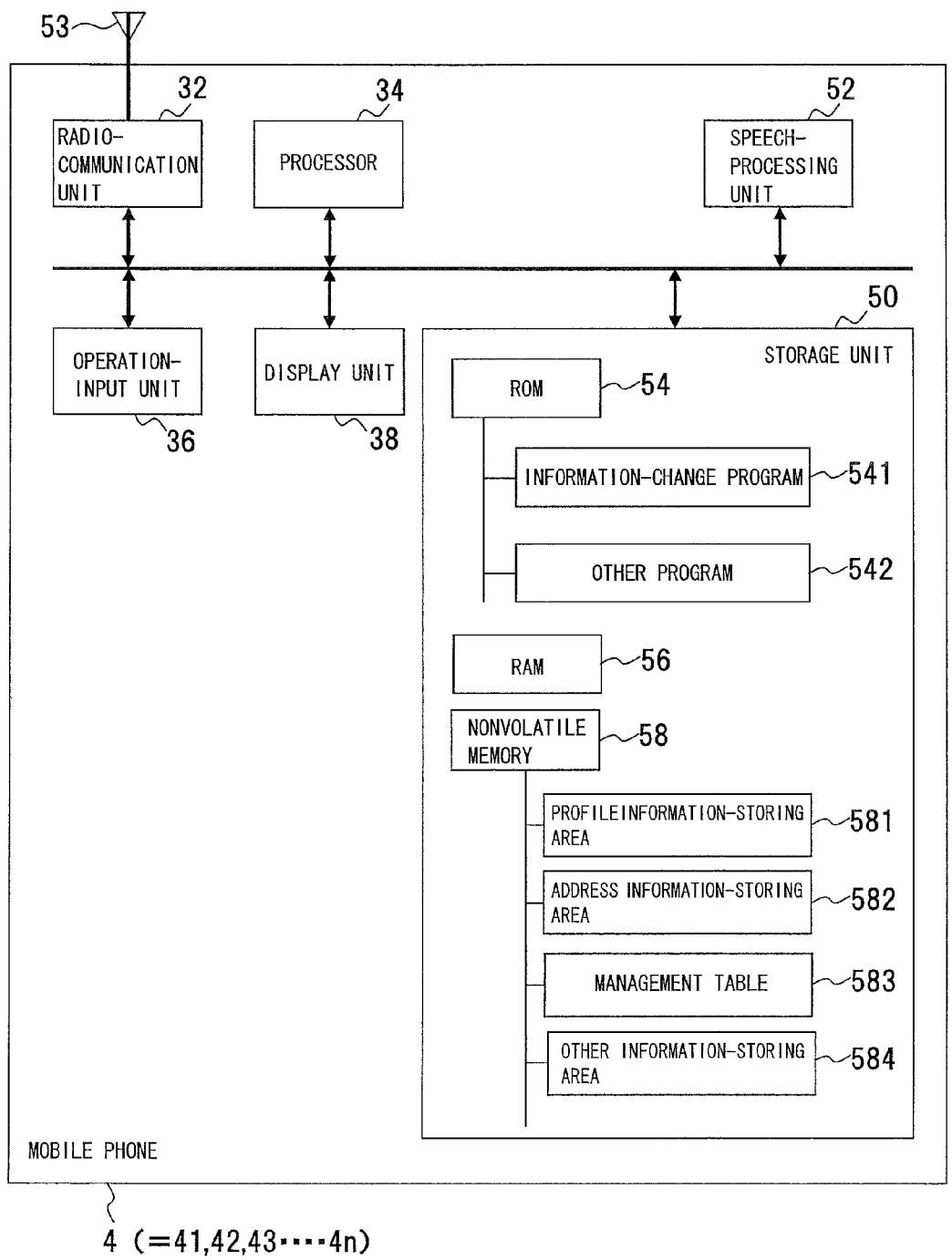
FIG. 4 shows an example configuration of a mobile phone.
Figure 5:
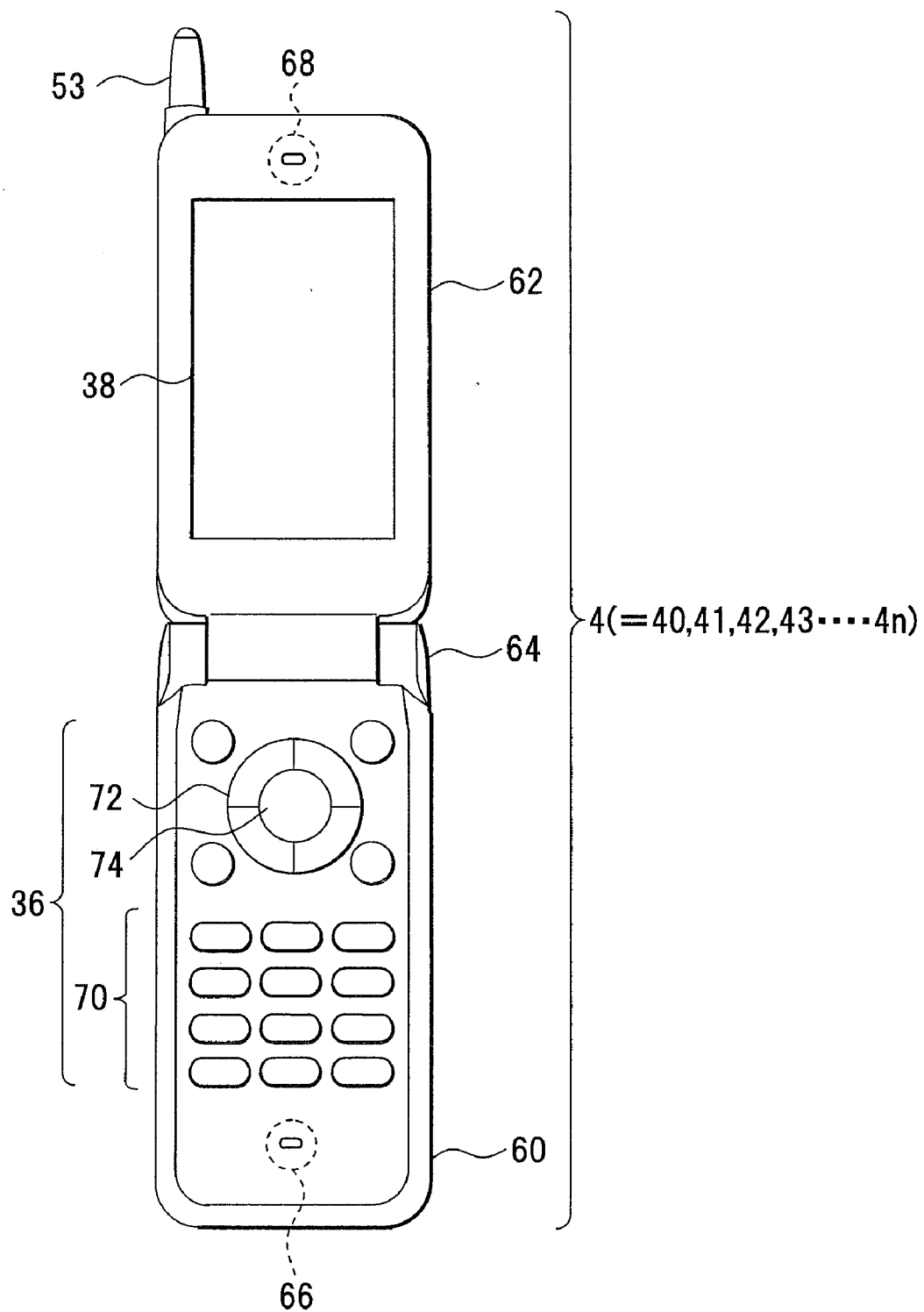
FIG. 5 shows an example of a mobile phone.

Next, the mobile phone will be described with reference to FIGS. 4 and 5. FIG. 4 shows a configuration example of the mobile phone and FIG. 5 shows an example of the mobile phone. In FIGS. 4 and 5, the same parts as those shown in FIG. 1 are designated by the same reference numerals.

The mobile phone 4 is an example of the above-described mobile phones 40, 41, 42, . . . , and 4n, and includes a radio-communication unit 32, a processor 34, an operation-input unit 36, a display unit 38, a storage unit 50, a speech-processing unit 52, and so forth.

The radio-communication unit 32 includes an antenna 53, so as to transmit and/or receive data and speech data to and/or from base stations 81, 82, . . . , and 8n via radio communications. Further, the radio-communication unit 32 includes a transmission unit configured to transmit notice information relating to the changed profile information 12, a reception unit configured to receive notice information relating to the changed profile information 12 of the communication destination, and a reception unit configured to receive notice information about a result of the change of address information 14 performed at the communication destination. For transmitting and/or receiving the data and/or speech data, the radio-communication unit 32 transmits a packet-communication-data signal and/or a speech signal such as an electronic mail to each of the base stations 81, 82, . . . , and 8n on a carrier signal under the control of the processor 34. Otherwise, the radio-communication unit 32 receives a radio-communication signal transmitted from each of the base stations 81, 82, . . . , and 8n, and obtains the speech signal and/or the packet-communication-data signal from the radio-communication signal.

The processor 34 includes a central-processing unit (CPU) or the like. When a program stored in the storage unit 50 is executed, the processor 34 performs input-and-output control. The input-and-output control includes reception of input information transmitted from the operation-input unit 36, controlling data transmission and/or data reception performed by the radio-communication unit 32, controlling display processing performed by the display unit 38, speech-data input and/or speech-data output performed by the speech-processing unit 52, and so forth. Further, the processor 34 performs control processing relating to data exchange for the storage unit 50, where the control processing includes data conversion relating to changing of the address information, storing data, transmitting notice information indicating the change-of-data result, and so forth.

The operation-input unit 36 includes a keyboard or the like, so as to input phone-number information and text information which forms an electronic mail or the like. Then, the operation-input unit 36 includes character keys, and a cursor key, an enter key, and so forth that are adapted to input various information including a response to a dialogue-display screen produced on the display unit 38, for example. The speech-processing unit 52 includes a speaker and a microphone, so as to transmit and/or receive speech data. The microphone is used for inputting transmission-speech data and the speaker is used for reproducing reception-speech data.

The display unit 38 includes a liquid-crystal display (LCD), for example, so as to produce a screen showing the waiting state and/or the communication state, and a dialogue screen used for correcting the profile information 12 and/or the address information 14, for example.

Further, the storage unit 50 includes a read-only memory (ROM) 54, a random-access memory (RAM) 56, and a non-volatile memory 58. The ROM 54 stores an information-change program 541 for the profile information 12 and/or the address information 14, and other program 542. The RAM 56 is used, as a work area. In the non-volatile memory 58, a plurality of profile information-storing areas 581, an address information-storing area 582, a management table 583, and other information-storing area 584 are set. The profile information-storing area 581 stores the profile information 12 including information about the phone number, mail address, and so forth of its own device. Further, the address information-storing area 582 stores the address information 14 including information about the phone number and/or mail address of each of at least one communication destination.

As shown in FIG. 5, the mobile phone 4 includes first and second cabinets 60 and 62 coupled to each other by a hinge unit 64 so that the first and second cabinets 60 and 62 are openable and closable. The cabinet 60 includes the operation-input unit 36, a microphone 66 of the speech-processing unit 52, and so forth. Further, the cabinet 62 includes the display unit 38 and a speaker 68 of the speech-processing unit 52. The operation-input unit 36 includes a plurality of symbol keys 70, a cursor key 72, an enter key 74, and so forth.

Figure 6:
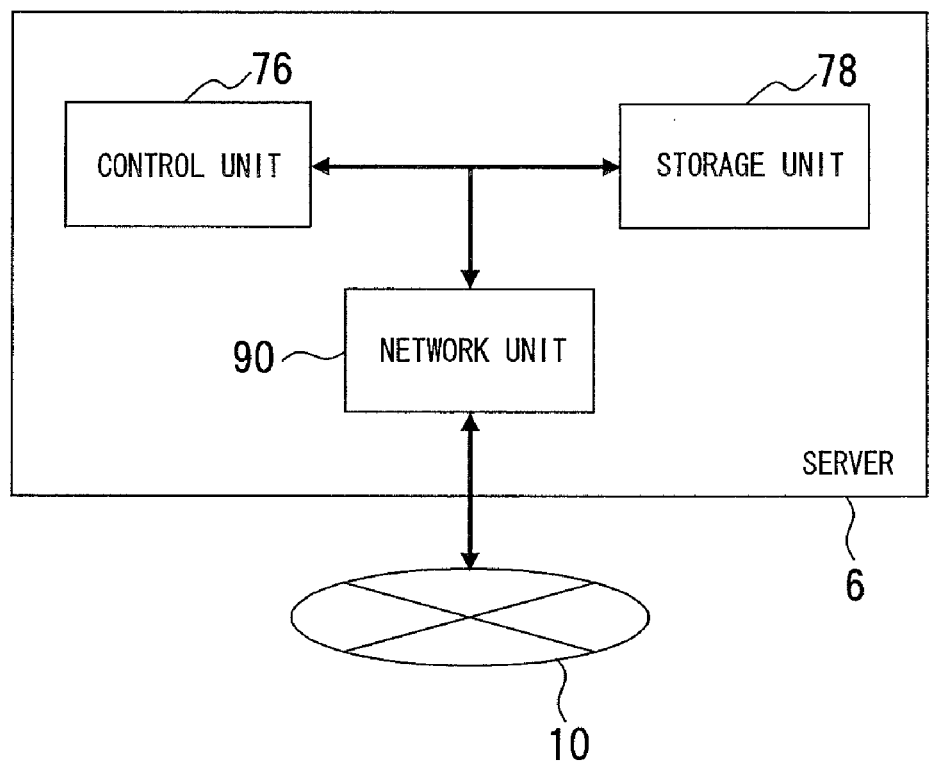
FIG. 6 shows a configuration example of a server apparatus.

Next, the server 6 will be described with reference to FIG. 6. FIG. 6 shows an example of the server 6. In FIG. 6, the same parts as those shown in FIG. 1 are designated by the same reference numerals.

The server 6 is provided, as a computer, and connected to the network 10. Further, the server 6 includes a control unit 76, a storage unit 78, a network unit 90, and so forth so that data can be exchanged between the server 6 and the mobile phones 4 (the mobile phones 40, 41, 42, . . . , and 4n) via the base stations 81, 82, and 8n.

When a program stored in the storage unit 78 is executed, the control unit 76 is connected to the network 10 via the network unit 90. Further, the control unit 76 performs the information exchange according to the function of the mobile phone 4, where the function relates to updating the address information 14. More specifically, the control unit 76 receives the change-of-profile notice information 16 transmitted from the mobile phone 40 shown in FIGS. 2 and 3 via the network unit 90, for example. Then, the control unit 76 transmits the change-of-profile notice information 26 corresponding to the change-of-profile notice information 16 to each of the mobile phones 41, 42, . . . , and 4n that are the communication destinations of the change-of-profile notice information 16. Further, upon receiving the result-of-change notice information 18 relating to the address information 14 transmitted from each of the mobile phones 41, 42, . . . , and 4n, the control unit 76 transmits the result-of-change notice information 28 corresponding to the result-of-change notice information 18 to the mobile phone 40.

In addition to the program relating to the exchange of the address information 14, the storage unit 78 stores information relating to the function of changing the address information 14 of the mobile phone 4, for example.

The network unit 90 includes a reception unit configured to receive the change-of-profile notice information 16 and/or the result-of-change notice information 18, and a transmission unit configured to transmit the change-of-profile notice information 26 and/or the result-of-change notice information 28.

Hereinafter, the processing procedures performed, so as to update the address information 14 of a destination terminal, will be described. The processing procedures are performed when the profile information 12 is changed.

A. The Preparation and Changing of Profile Information

Figure 7:
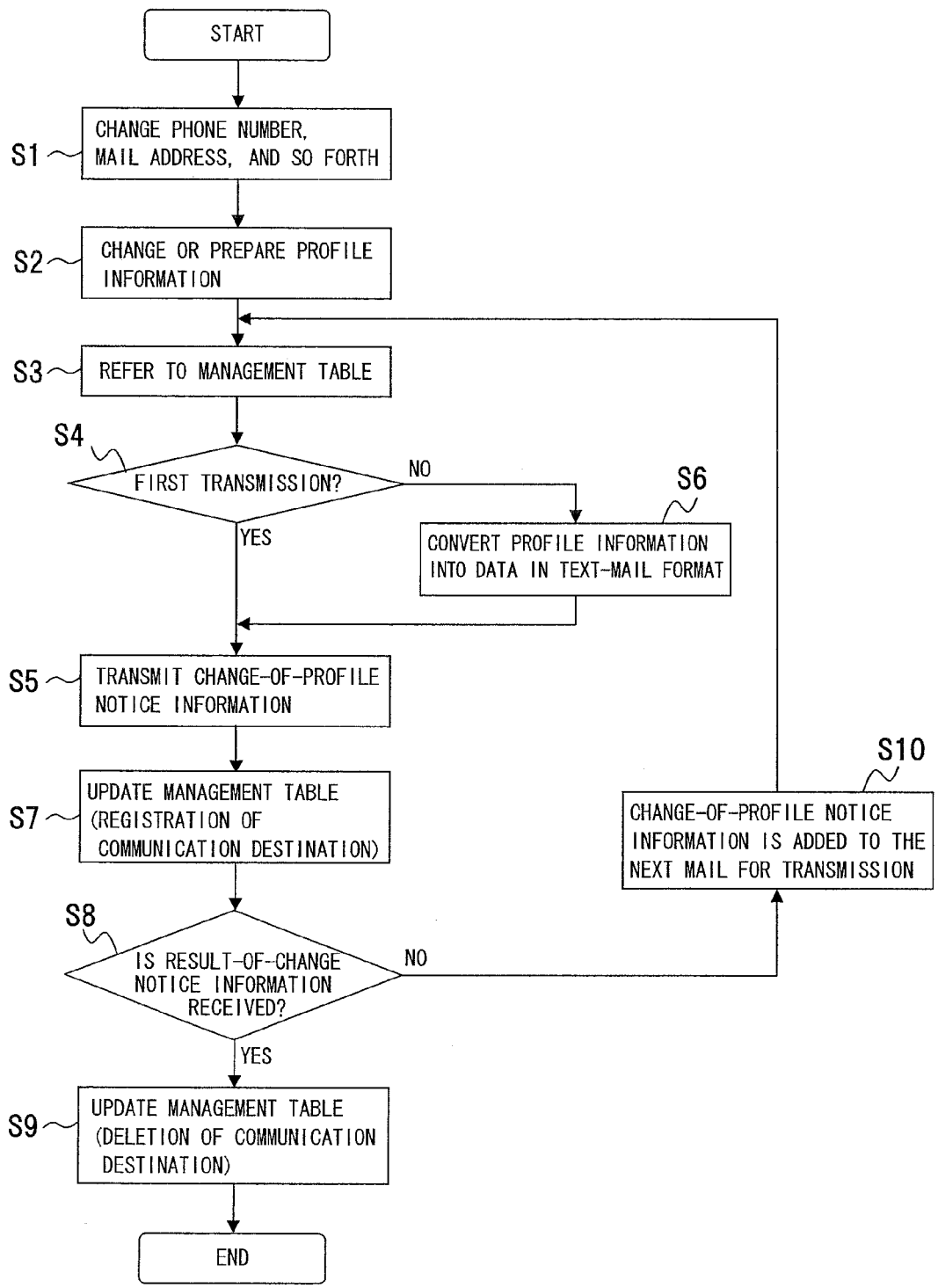
FIG. 7 is a flowchart showing an example of processing procedures performed, so as to change data registered with the mobile phone.

Processing procedures performed for the profile information will be described with reference to FIG. 7. FIG. 7 is a flowchart showing an example of processing procedures performed, so as to change data registered with a mobile phone.

For example, if the profile information 12 including the phone number, mail address, and so forth of the mobile phone 40 shown in FIGS. 2 and 3 is changed, the above-described processing procedures are performed so that the change-of-profile notice information 16 is transmitted to each of the mobile phones 41, 42, and 4n that are determined to be the communication destination.

Therefore, when the phone number and/or the mail address is changed, for example, (step S1), the information-change program 541 is started on a menu screen so that the profile information 12 is prepared and/or changed (step S2). Then, the user refers to the management table 583 (step S3) and determines whether or not data is transmitted for the first time (step S4). If the data is transmitted for the first time (YES at step S4), the user transmits the change-of-profile notice information 16 (step S5).

If it is determined that the data is not transmitted for the first time (NO at step S4), the profile information 12 is converted into data in the text-mail format (step S6), and the change-of-profile notice information 16 is transmitted (step S5). The above-described text-mail-format conversion is performed, as countermeasures against an error which occurs in the previous data exchange performed with a destination terminal.

The change-of-profile notice information 16 is transmitted to a communication destination shown in the address information 14, that is, a communication destination of which information is registered with the address information-storing area 582 (the telephone book and/or the address book) of the mobile phone 41, by multi address transmission (broadcast transmission). After the change-of-profile notice information 16 is transmitted, the management table 583 is updated (step S7) so that the information about the communication destination is registered with the management table 583.

After the change-of-profile notice information 16 is transmitted, it is determined whether or not the result-of-change notice information 28 transmitted from the server 6 is received (step S8). If it is determined that the result-of-change notice information 28 is received (YES at step S8), the management table 583 is updated so that information about a transmission destination is deleted (step S9), whereby the above-described processing procedures are finished.

If it is determined that the result-of-change notice information 28 is not received (NO at step S8), the change-of-profile notice information 16 is added to the next mail for transmission, and the next mail and the change-of-profile notice information 16 are transmitted (step S10). Then, the processing moves to step S3 so that the processing procedures corresponding to steps S3 to S9 are performed, whereby the processing procedures are finished.

B. Settings on Transmission of Profile Information 12

Figure 8:
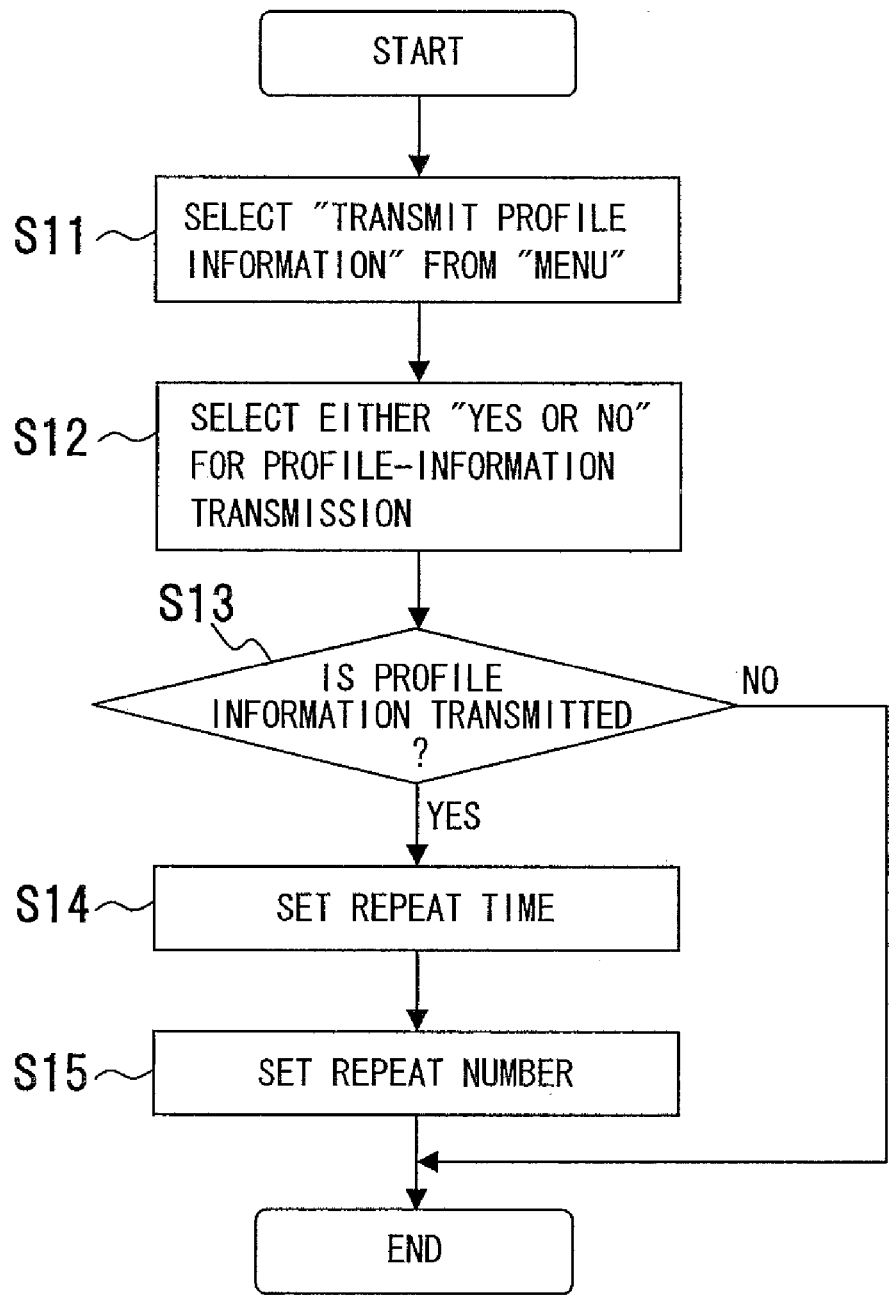
FIG. 8 is a flowchart showing an example of processing procedures performed, so as to make settings on profile-information transmission.
Figure 9:
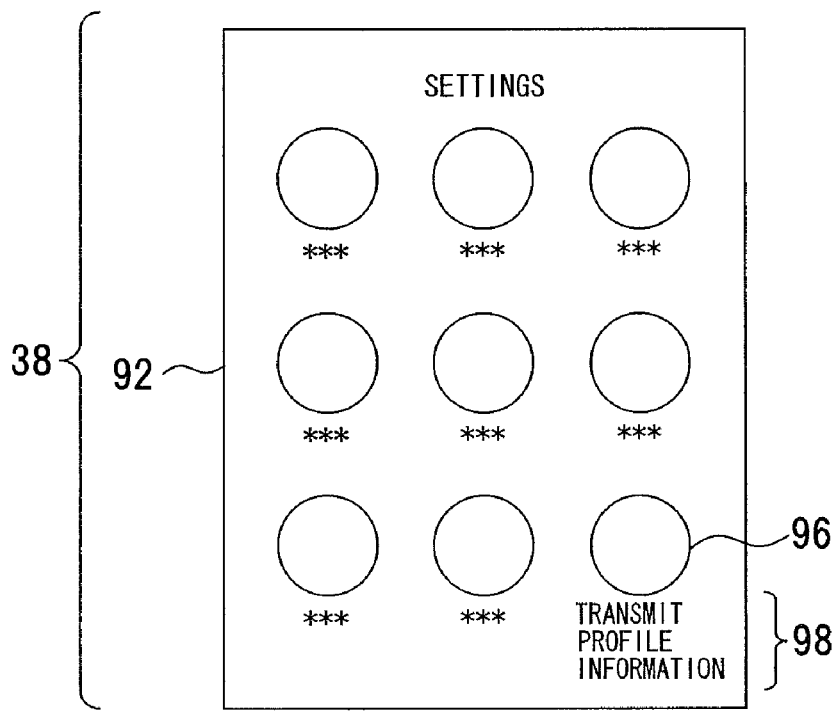
FIG. 9 shows a menu-setting screen.
Figure 10:
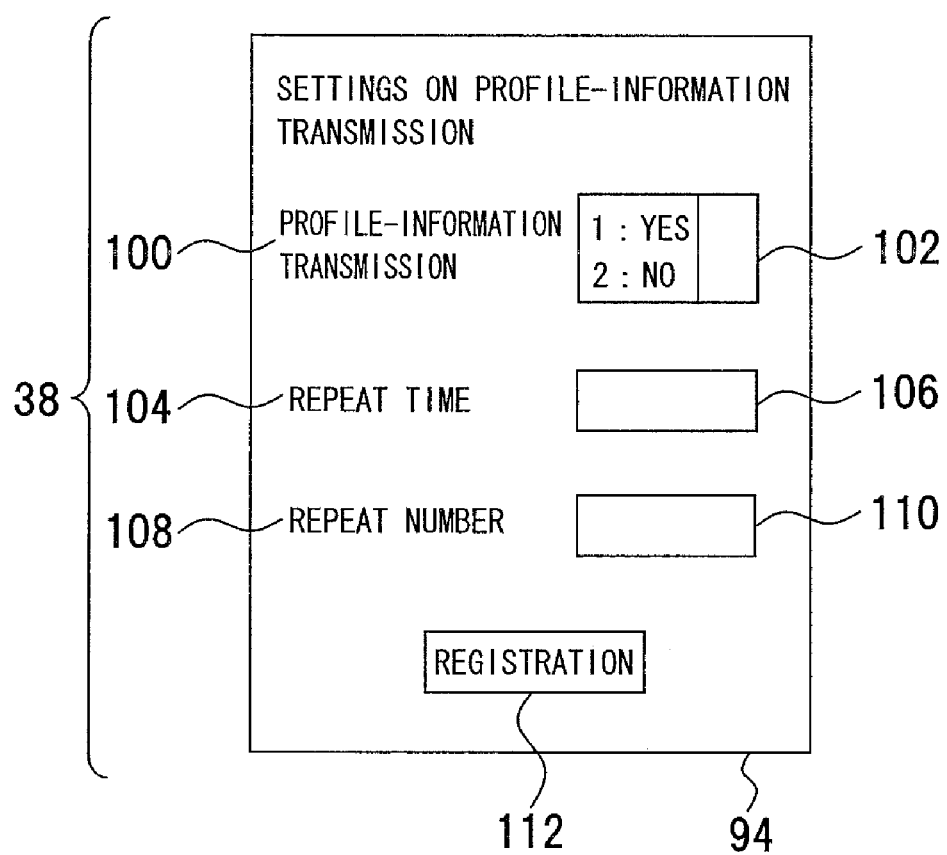
FIG. 10 shows a profile information-transmission setting screen.

FIGS. 8, 9, and 10 illustrate processing procedures performed, so as to make settings on transmission of the profile information 12. FIG. 8 is a flowchart showing an example of processing procedures performed, so as to make the profile information-transmission settings, FIG. 9 shows a menu-setting screen, and FIG. 10 shows a profile information-transmission-setting screen.

For making the settings on the transmission of the profile information 12, a menu-setting screen 92 shown in FIG. 9 is produced and "transmit profile information" is selected on the menu-setting screen 92 (step S11). Then, the screen advances to a profile information-transmission-setting screen 94 shown in FIG. 10, so as to determine whether or not the profile information should be transmitted on the profile information-transmission-setting screen 94 (step S12). For determining whether or not the profile information for transmission exists, the user selects either "YES" or "NO" shown on a dialogue box 102 of the profile information-transmission-setting screen 94 (step S13). If it is determined that the profile information for transmission exists (YES at step S13), the user inputs information about repeat time onto a dialogue box 106 (step S14), and inputs information about the repeat number onto a dialogue box 110 (step S15). After the above-described settings are accepted, the processing procedures are finished.

According to the settings on transmission of the profile information 12, the repeat-time information as transmission interval denotes time intervals at which the profile information 12 is repeatedly transmitted. Further, the repeat-number information denotes the number of repetitive transmission of the profile information 12.

On the contrary, if it is determined that the profile information for transmission does not exist (NO at step S13), the processing procedures are finished without making the settings on the repeat time and/or the repeat number.

As shown in FIG. 9, the menu-setting screen 92 shows various types of menus and icons, and particularly shows an icon 96 adapted to make profile information-transmission settings and a menu-display 98 showing a message "transmit profile information". When the user specifies the icon 96 and selects the icon 96 by pressing down the enter key 74, the screen image is changed to the profile information-transmission-setting screen 94.

As shown in FIG. 10, the profile information-transmission-setting screen 94 shows a dialogue message 100 which reads "profile-information transmission" and the dialogue box 102 used for inputting information indicating whether or not the profile information for transmission exists, a dialogue message 104 which reads "repeat time" and the dialogue box 106 where information about a response to the dialogue message 104 is inputted, and a dialogue message 108 which reads "repeat number" and the dialogue box 110 where information about a response to the dialogue message 108 is inputted. Further, the profile information-transmission-setting screen 94 shows a registration button 112 configured to accept and register the above-described information inputted thereon.

After the above-described information is input onto the dialogue boxes 102, 106, and 110, the user presses down the enter key 74 corresponding to the registration button 112, so as to accept the input information.

Figure 11:
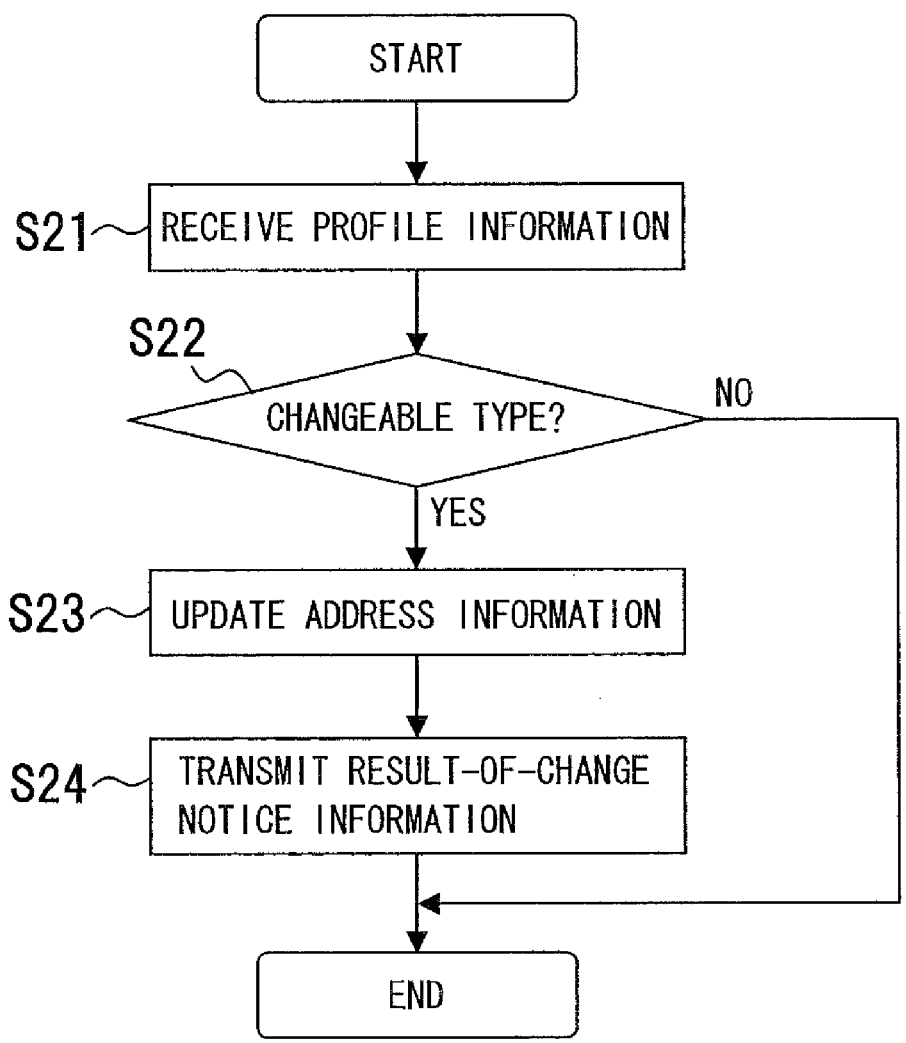
FIG. 11 shows a flowchart showing an example of processing procedures performed, so as to change address information.
Figure 12:
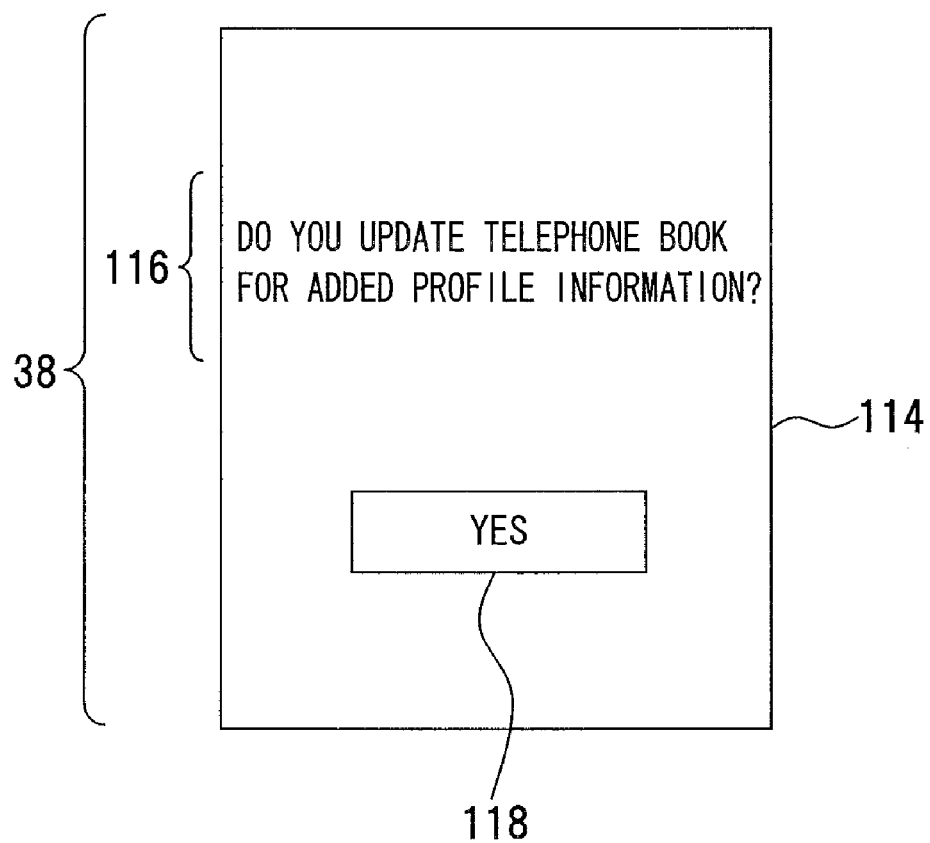
FIG. 12 shows a dialogue screen produced upon receiving the profile information.

C. Change of Address Information Due to Reception of Change-of-Profile Notice Information The changing of address information will be described with reference to FIGS. 11 and 12. FIG. 11 is a flowchart showing an example of processing procedures performed, so as to change the address information. FIG. 12 shows a dialogue screen produced upon receiving the profile information.

The address-information-change processing procedures are started when the profile information 12 is changed and/or prepared. That is to say, the address-information-change processing procedures are performed upon receiving the profile information 12 and the change-of-profile notice information 16 corresponding thereto. The address-information-change processing procedures are performed via the server 6.

For example, the profile information 12 and the change-of-profile notice information 16 that are transmitted from the mobile phone 40 shown in FIGS. 2 and 3 are received in the mobile phones 41 to 4n via the server 6 (step S21). In each of the mobile phones 41 to 4n, it is determined whether or not the address information 14 is a changeable type according to the profile information 12 received therein (step S22). If it is determined that the address information 14 is changeable (YES at step S22), a change-setting screen 114 of the address information 14 is produced, as shown in FIG. 12, and the address information 14 is updated (step S23).

After the address information 14 is changed, each of the mobile phones 41 and 42 generates and transmits the result-of-change notice information 18 to the server 6 (step S24), thereby finishing the processing procedures. The server 6 transmits the result-of-change notice information 28 corresponding to the result-of-change notice information 18 to the mobile phone 40. If the address information 14 is not a changeable type for the mobile phone 4n (NO at step S22), the processing procedures are finished.

Thus, in each of the mobile phones 41 and 42, the address information 14 is updated according to the profile information 12 transmitted thereto, as shown in FIG. 3, and the result-of-change notice information 18 corresponding to the updated address information 14 is transmitted to the server 6. Upon receiving the result-of-change notice information 18, the server 6 transfers the result-of-change notice information 28 to the mobile phone 40. Subsequently, the server 6 and the mobile phone 40 can confirm that the address information 14 is updated in each of the mobile phones 41 and 42. Further, if the mobile phone 4n is not configured to update the address information 14, the address information 14 is not updated and the result-of-change notice information 18 corresponding to the address information 14 is not issued, so that the server 6 and the mobile phone 40 can determine that the mobile phone 4n is not configured to change the address information 14.

Then, the change-setting screen 114 of the address information 14 shows a dialogue message 116 which reads "Profile information is attached. Do you want to update the telephone book?", as shown in FIG. 12. Further, the change-setting screen 114 of the address information 14 shows a response button "YES" 118, so as to respond to the dialogue message 116. If the user selects the response button 118, the profile information 12 affects the address information 14 of each of the mobile phones 41 to 4n so that the address information 14 is updated. After the address information 14 is updated automatically in the above-described manner, the screen produced on each of the mobile phones 41 to 4n is restored to a waiting screen.

D. Processing Procedures Performed Between the Server 6 and the Mobile Phones

Figure 13:
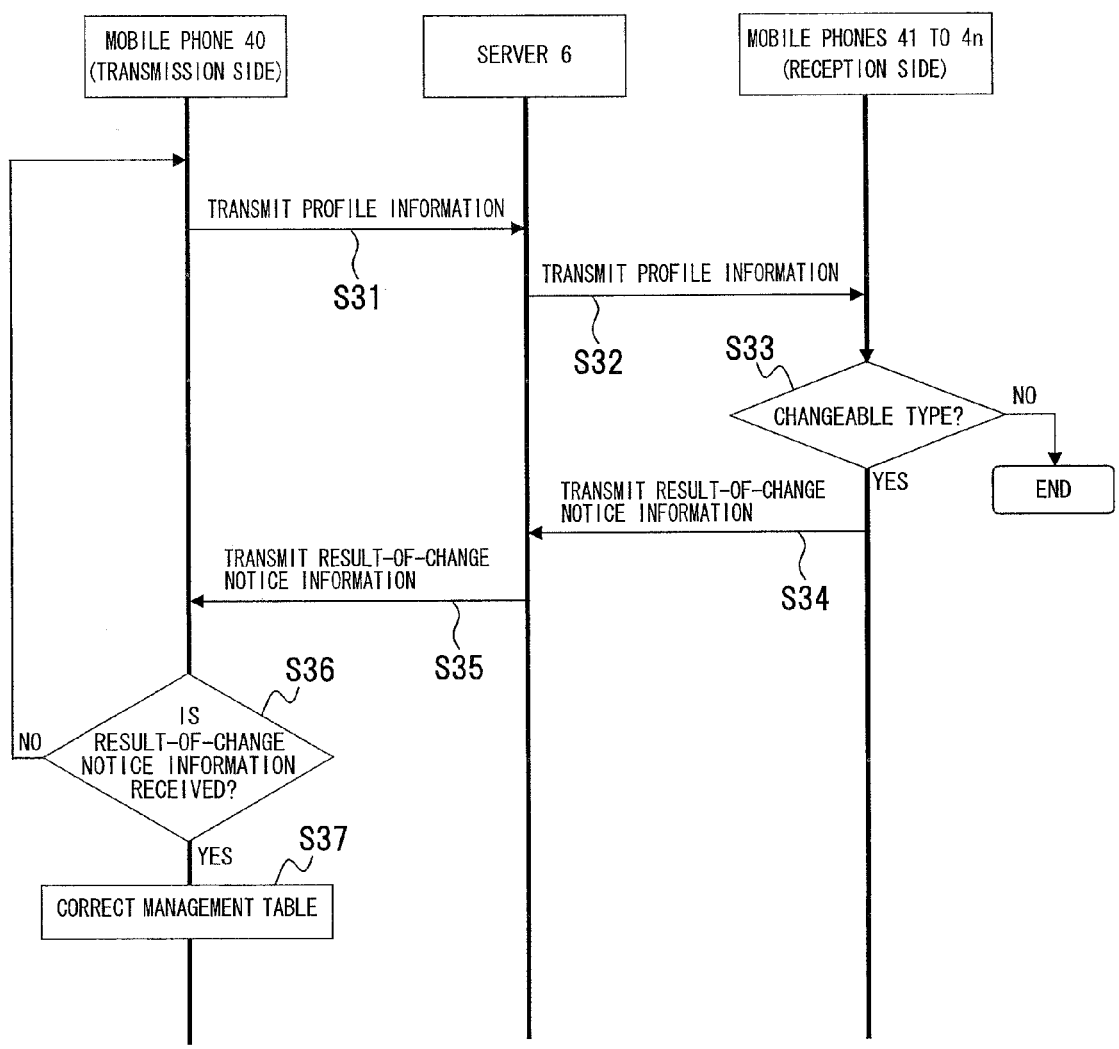
FIG. 13 shows an address information-change sequence performed between mobile phones via a server apparatus.

Processing procedures performed for the address information 14 will be described with reference to FIG. 13. More specifically, FIG. 13 shows the sequence of processing procedures performed, so as to change the address information 14. The processing procedures are performed between the mobile phones via the server 6.

Regarding the mobile phone 40 with the profile information 12 changed, the mobile phones 41 to 4n receiving the change-of-profile notice information 16 corresponding to the changed profile information 12, and server 16, as described above, the mobile phone 40 transmits the profile information 12 to the server 6 (step S31), and the server 6 transmits the profile information 12 to the mobile phones 41 to 4n which are change-request destinations (step S32).

It is determined whether or not the address information 14 is a changeable type for the mobile phones 41 to 4n (step S33). If the address information 14 can not be changed by each of the mobile phones 41 to 4n, the processing procedures are finished. Otherwise, the address information 14 is changed, and the result-of-change notice information 18 corresponding to the updated address information 14 is transmitted (step S34). Upon receiving the result-of-change notice information 18, the server 6 notifies the mobile phone 40 of the result-of-change notice information 28 corresponding to the result-of-change notice information 18 (step S35).

The mobile phone 40 monitors whether or not the result-of-change notice information 28 is received therein (step S36). If the result-of-change notice information 28 is not received, the mobile phone 40 transmits the profile information 12 again. If the result-of-change notice information 28 is received, information indicating that the above-described processing relating to the change notice is finished is registered with the management table 583 (step S37), so that the above-described processing procedures are finished.

According to the first embodiment as described above, the following processing can be performed by a mobile phone which has difficulty in updating registered data automatically.

If the change-of-profile notice information 16 is transmitted to the mobile phone at least two times and no response is transmitted from the mobile phone, it is determined that the mobile phone is not configured to change the address information 14. Subsequently, a change notification may be made by transmitting a mail to the mobile phone, where a message indicating that the profile information 12 has been changed is attached to the mail. Further, since the server 6 can determine whether or not a destination-mobile phone can change the address information 14 automatically, the server 6 may determine whether or not the changed profile information 12 can be transmitted, after receiving a change-notice mail. Further, the server 6 can notify the destination-mobile phone of the changed profile information 12 according to the function of the destination-mobile phone. In any case, the profile information 12 is transmitted continuously until the result-of-change notice information is received from the mobile phone on the reception side.

Second Embodiment

Figure 14:
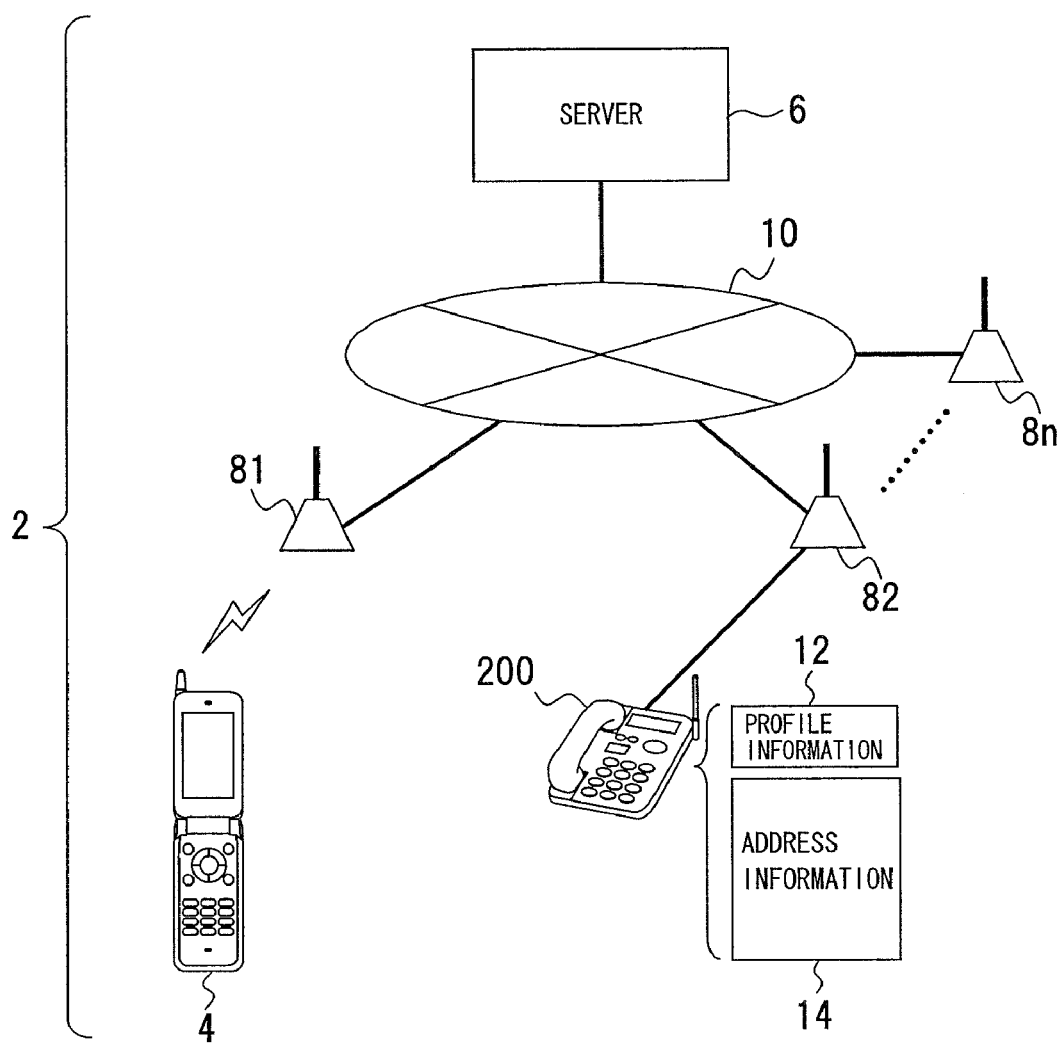
FIG. 14 shows an address information-exchange system according to a second embodiment of the present invention.

Next, a second embodiment of the present invention will be described with reference to FIG. 14. FIG. 14 shows an address information-exchange system according to the second embodiment of the present invention. In FIG. 14, the same parts as those shown in FIGS. 1 and 2 are designated by the same reference numerals.

The address information-exchange system 2 may include fixed telephones 200 connected to the base station 8*n*, as the plurality of communication terminals, in addition to the mobile phones 4 so that the processing adapted to change the address information 14 may be performed between the mobile phones 4 and the fixed telephones 200 when the profile information 12 is changed. The change processing for the profile information 12 may be performed between the fixed telephones 200. Thus, the present invention can be achieved by using radio communications and/or wired communications without being limited to the mobile phones.

Figure 15:
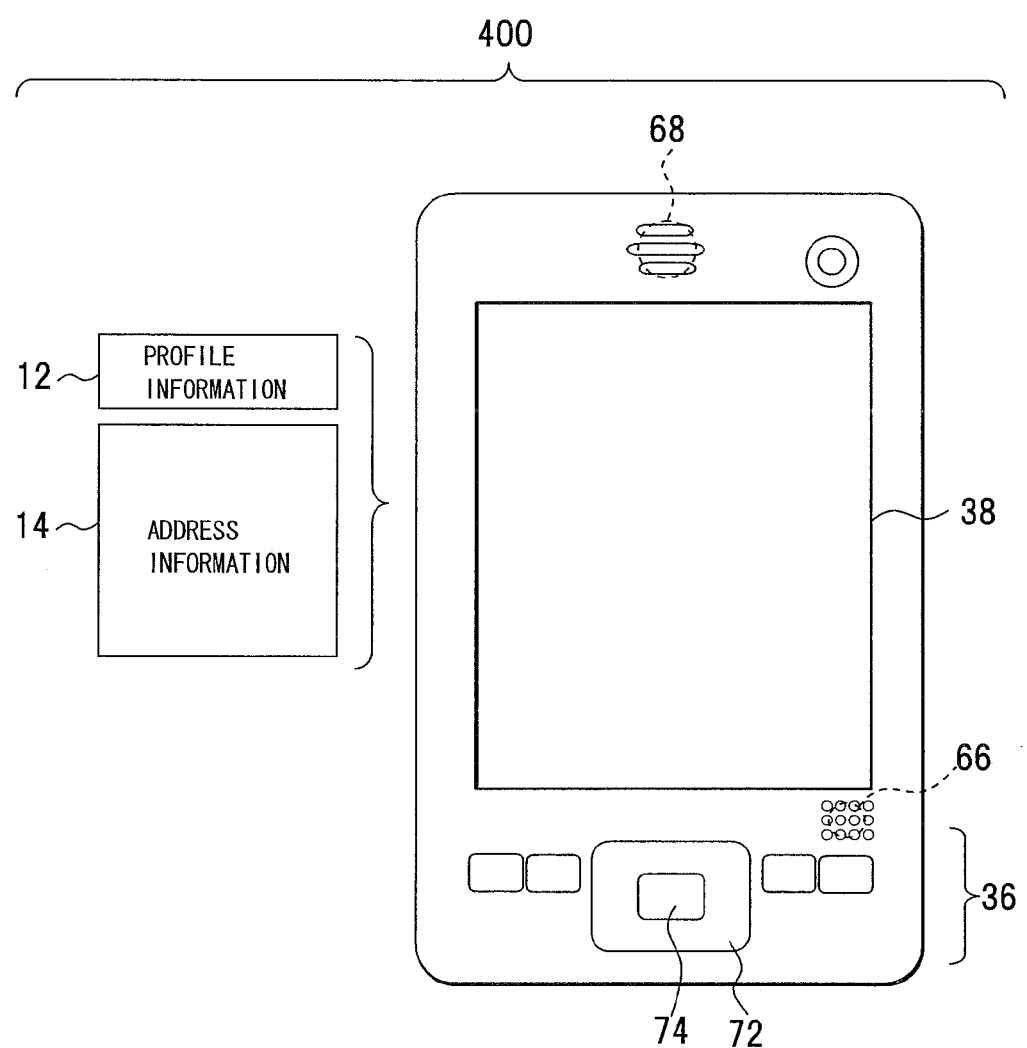
FIG. 15 shows a personal-digital assistant (PDA) according to another embodiment of the present invention.
Figure 16:
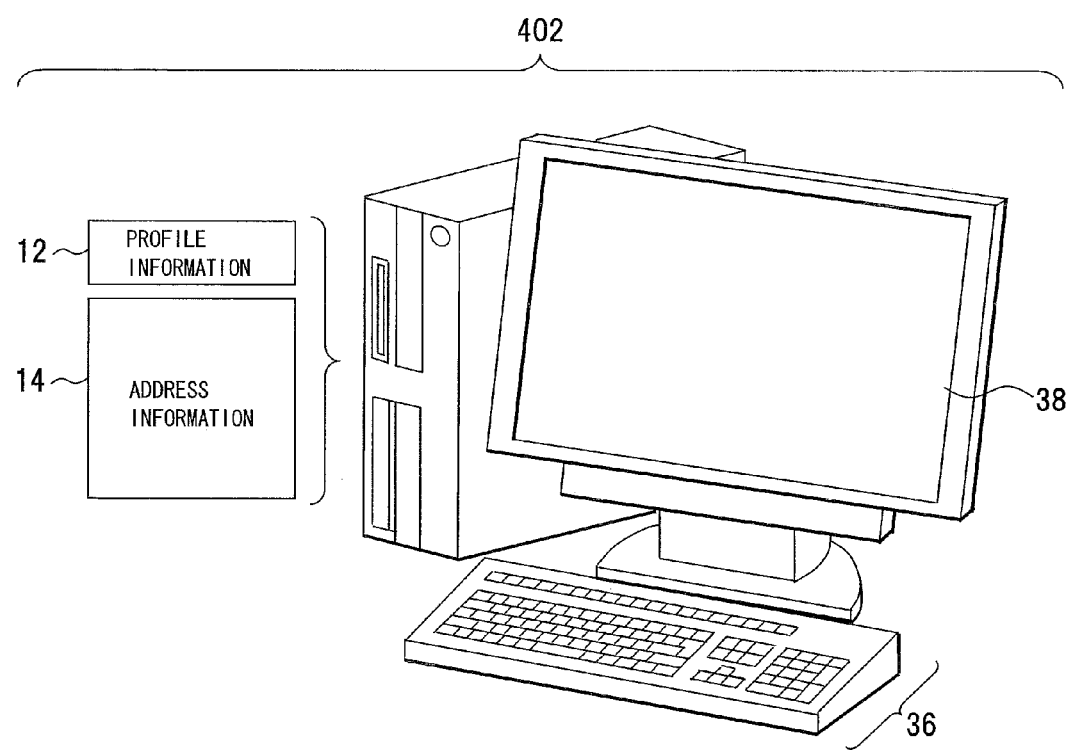
FIG. 16 shows a personal computer (PC) according to another embodiment of the present invention.

Other Embodiments (1) In the above-described embodiment, the mobile phones and the fixed telephones have been described, as the communication terminals. However, the present invention can be used for various communication terminal devices having communication functions and address information including information about phone numbers, mail addresses, and so forth. For example, the present invention can be used for a personal digital assistant (PDA) 400 shown in FIG. 15 and/or a personal computer 402 shown in FIG. 16. In FIGS. 15 and 16, the same parts as those shown in FIG. 2 are designated by the same reference numerals and the description thereof is omitted.

(2) The function of a communication terminal device which is not configured to convert address information collectively, such as an old-style communication terminal, may be detected by the communication terminal device on the transmission side and/or the server.

Other Inventive Matters

While inventive matters extracted from the above-mentioned embodiments are wide-ranging and shown in CLAIMS, further inventive matters are enumerated as follows.

(ADDITIONAL REMARK 1) A communication terminal device comprising:
 an address information-storage unit configured to store address information relating to a communication destination;
 a reception unit configured to receive a change notification indicating that profile information of the communication destination is changed; and
 an address information-change unit configured to change the address information stored in the address information-storage unit on the basis of the change notification.

(ADDITIONAL REMARK 2) A communication terminal device according to ADDITIONAL REMARK 1, further comprising a display unit configured to show information,
 wherein the display unit produces a dialogue screen adapted to ask whether or not the address information should be changed, and
 wherein it is determined whether or not the address information is changed on the basis of response information to the dialogue screen.

(ADDITIONAL REMARK 3) An address information-exchange method comprising the steps of:
 processing adapted to receive a change notification indicating that profile information of a communication destination is changed; and
 processing adapted to change address information stored in an address information-storage unit on the basis of the change notification.

(ADDITIONAL REMARK 4) An address information-exchange method according to ADDITIONAL REMARK 3, further comprising:
 processing adapted to produce a dialogue screen adapted to ask whether or not the address information of the communication destination should be changed, and
 processing adapted to receive information indicating whether or not the address information is changed on the basis of response information to the dialogue screen.

(ADDITIONAL REMARK 5) An address information-exchange method comprising:
 processing adapted to receive a change notification of profile information, where the change notification is transmitted from a first communication terminal device, and/or a response notification transmitted from a second communication terminal device corresponding to the first communication terminal device, where the response notification relates to changing of address information; and
 processing adapted to transmit the change notification transmitted from the first communication terminal device to the second communication terminal device and/or transmit the response notification transmitted from the second communication terminal device to the first communication terminal device.

(ADDITIONAL REMARK 6) An address information-exchange method according to ADDITIONAL REMARK 5, further comprising:
 processing adapted to store information indicating whether or not a destination-communication terminal device can change address information in response to the change notification; and
 processing adapted to transmit a response notification to the first communication terminal device on the basis of the information indicating whether or not the address information can be changed upon receiving the change notification transmitted from the first communication terminal device.

(ADDITIONAL REMARK 7) An address information-exchange program executed by a computer, the program comprising the steps of:
 receiving a change notification indicating that profile information of a communication destination is changed; and
 changing address information stored in an address information-storage unit on the basis of the change notification.

(ADDITIONAL REMARK 8) An address information-exchange program according to ADDITIONAL REMARK 7, further comprising the steps of:
 producing a dialogue screen adapted to ask whether or not the address information of the communication destination should be changed, and
 receiving information indicating whether or not the address information is changed on the basis of response information to the dialogue screen.

(ADDITIONAL REMARK 9) An address information-exchange program executed by a computer, the program comprising:
 processing adapted to receive a change notification of profile information, where the change notification is transmitted from a first communication terminal device, and/ or a response notification transmitted from a second communication terminal device corresponding to the first communication terminal device, where the response notification relates to changing of address information; and processing adapted to transmit the change notification transmitted from the first communication terminal device to the second communication terminal device and/or transmit the response notification transmitted from the second communication terminal device to the first communication terminal device.

(ADDITIONAL REMARK 10) The address information-exchange program according to ADDITIONAL REMARK 9, further comprising the steps of:

storing information indicating whether or not a destination-communication terminal device can change address information in response to the change notification; and transmitting a response notification to the first communication terminal device on the basis of the information indicating whether or not the address information can be changed upon receiving the change notification transmitted from the first communication terminal device.

The present invention relates to changing of the address information of a communication terminal such as a mobile phone having communication functions and address information including information about phone numbers, mail addresses, and so forth. According to the present invention, it becomes possible to automatically change the address information of a communication destination when change-of-profile notice information is issued. Further, upon receiving a notification indicating the change result, the communication terminal on the transmission side can be notified that whether or not the address information can be changed.

As described above, the present invention is described in most preferred embodiment, the present invention is not limited to by the above description, as a matter of course, any modification or change by those skilled in the art based on the scope of the present specification may be possible. Therefore, such modification or change is included in the scope of the present invention.

What is claimed is:

1. An address information-exchange system comprising:
a first communication terminal device configured to transmit a change notification indicating that profile information registered with the first communication terminal device is changed, the change notification including changed profile information;
a second communication terminal device configured to register address information of the first communication terminal device, receive the change notification, and change the address information on the basis of the changed profile information included in the change notification to transmit a response notification relating to changing of the address information; and
a server apparatus configured to receive the change notification sent by the first communication terminal device, transmit the change notification to the second communication terminal device, receive the response notification sent by the second communication terminal device, and transmit the response notification to the first communication terminal device,
wherein the changed profile information is for changing the address information of the first communication terminal device, the address information being registered with the second communication terminal device, and
wherein the first communication terminal device converts the changed profile information into a text-mail format in case where the first communication terminal device does not receive the response notification from the second communication terminal device after transmission of the change notification, and transmits the changed profile information after conversion.

2. The address information-exchange system according to claim 1, wherein the first communication terminal device transmits a message indicating that the profile information is changed in a case where the first communication terminal device does not receive the response notification.

3. A communication terminal device comprising:
a profile-information storage unit configured to store profile information;
an address information-storage unit configured to store address information about a communication destination;
a transmission unit configured to transmit a change notification indicating that the profile information is changed, the change notification including changed profile information for changing the address information of the communication terminal device, the address information being registered with the communication destination, in a case where the profile information is changed; and
a transmission-control unit configured to convert the changed profile information into a text-mail format in case where a response notification is not received, and make the transmission unit transmit a change notification including the changed profile information after conversion until the response notification is received, where the response notification relates to changing of the address information of the communication terminal device registered in the communication destination, the address information being changed based on the changed profile information of the transmitted change notification.

4. The communication terminal device according to claim 3, wherein the transmission-control unit makes the transmission unit transmit the change notification at predetermined time intervals and/or a predetermined number of times.

5. A communication terminal device comprising:
a profile-information storage unit configured to store profile information;
an address information-storage unit configured to store address information about a communication destination;
a transmission unit configured to transmit a change notification indicating that the profile information is changed, the change notification including changed profile information that is a type able to change the address information of the communication terminal device, the address information being registered with the communication destination, in a case where the profile information is changed;
a transmission-control unit configured to make the transmission unit transmit the change notification until a response notification is received, where the response notification relates to changing of the address information of the communication terminal device registered in the communication destination, the changing being based on the changed profile information of the transmitted change notification; and
a display unit configured to show information,
wherein the display unit produces a dialogue screen adapted to ask about time intervals and/or a number of times the change notification is transmitted, so as to receive information about the time intervals and/or the number of times.

6. A server apparatus comprising:
a reception unit configured to receive a change notification indicating that profile information registered with a first communication terminal device is changed, the change notification including changed profile information that is a type able to change address information of the first communication terminal device, the address information being registered with the communication destination of the first communication terminal device, from the first communication terminal device;
a transmission unit configured to transmit the change notification transmitted from the first communication terminal device to the second communication terminal device corresponding to the first communication terminal device;
a storage unit configured to store the address information; and
a control unit configured to convert the change notification according to determination whether or not the second communication terminal device is able to change the address information of the first communication terminal device automatically based on the changed profile information, the address information being registered in the second communication terminal device,
wherein change notification according to a function of the second communication terminal device is transmitted from the transmission unit to the second communication terminal device.

7. The server apparatus according to claim 6, further comprising:
a storage unit configured to store information indicating whether or not the second communication terminal device can change the address information in response to the change notification; and
a control unit configured to make the transmission unit transmit a response notification to the first communication terminal device on the basis of the information stored in the storage unit upon receiving the change notification transmitted from the first communication terminal device.

8. The server apparatus according to claim 6, wherein
the reception unit receives a response notification relating to the changing of the address information of the first communication terminal device registered with the second communication terminal device, the address information being based on the changed profile information of the change notification, from the second communication terminal device, and
wherein the transmission unit transmits the response notification to the first communication terminal device.

9. An address information-exchange method comprising:
processing adapted to transmit a change notification indicating that profile information is changed, the change notification including changed profile information that is for changing a the address information registered with a communication destination, in a case where the profile information is changed; and
processing adapted to convert the changed profile information into a text-mail format in case where a response notification is not received, and transmit a change notification including the changed profile information after conversion until the response notification is received, where the response notification relates to changing of the address information registered with the communication destination, the address information being changed based on the changed profile information of the transmitted change notification.

10. The address information-exchange method according to claim 9, further comprising:
processing adapted to determine time intervals and/or number of times the change notification is transmitted; and
processing adapted to transmit the change notification at the determined time intervals and/or the determined number of times.

11. An address information-exchange method comprising:
processing adapted to transmit a change notification indicating that profile information is changed, the change notification including changed profile information that is a type able to change the address information registered with a communication destination, in a case where the profile information is changed;
processing adapted to transmit the change notification until a response notification is received, where the response notification relates to changing of the address information registered with the communication destination, the changing being based on the changed profile information of the transmitted change notification;
processing adapted to produce a dialogue screen adapted to ask about time intervals and/or number of times the change notification is transmitted; and
processing adapted to receive information about the time intervals and/or the number of times.

12. A non-transitory computer-readable recording medium storing an address information-exchange program executed by a computer, the program causes the computer to perform a process comprising:
transmitting a change notification indicating that profile information is changed, the change notification including changed profile information that is for changing address information registered with a communication destination, in a case where the profile information is changed; and
converting the changed profile information into a text-mail format in case where a response notification is not received, and transmitting a change notification including the changed profile information after conversion until the response notification is received, where the response notification relates to changing of the address information registered with the communication destination, the address information being changed based on the changed profile information of the transmitted change notification.

13. The non-transitory recording medium according to claim 12, the process further comprising:
determining time intervals and/or number of times the change notification is transmitted; and
transmitting the change notification at the determined time intervals and/or the determined number of times.

14. A non-transitory computer-readable recording medium storing an address information-exchange program executed by a computer, the program causes the computer to perform a process comprising:
transmitting a change notification indicating that profile information is changed, the change notification including changed profile information that is a type able to change address information registered with a communication destination, in a case where the profile information is changed;
transmitting the change notification until a response notification is received, where the response notification relates to changing of the address information registered with the communication destination, the changing being based on the changed profile information of the transmitted change notification;

producing a dialogue screen adapted to ask about time intervals and/or number of times the change notification is transmitted; and receiving information about the time intervals and/or the number of times.

15. A communication terminal device comprising:
an address information-storage unit configured to store address information about a communication destination;
a reception unit configured to receive a change notification indicating that profile information of the communication destination is changed, the change notification including changed profile information that is for changing the address information of the communication destination, the address information being stored with the address information-storage unit; and
a control unit configured to determine whether the address information of the communication destination is able to be changed, the address information being stored in the address information-storage unit, based on the changed profile information of the change notification received by the reception unit, and when the address information is able to be changed, change the address information and generate a response notification relating to changing of the address information.

16. An address information-exchange method comprising:
receiving a change notification indicating that profile information of a communication destination is changed, the change notification including changed profile information that is for changing address information of the communication destination, the address information being stored with an address information-storage unit; and
determining whether the address information of the communication destination is able to be changed, the address information being stored in the address information-storage unit, based on the changed profile information of the change notification that is received, and when the address information is able to be changed, changing the address information and generating a response notification relating to changing of the address information.

17. A non-transitory computer-readable recording medium storing an address information-exchange program executed by a computer, the program causes the computer to perform a process comprising:
receiving a change notification indicating that profile information of a communication destination is changed, the change notification including changed profile information that is for changing address information of the communication destination, the address information being stored with an address information-storage unit; and
determining whether the address information of the communication destination is able to be changed, the address information being stored in the address information-storage unit, based on the changed profile information of the change notification that is received, and when the address information is able to be changed, changing the address information and generating a response notification relating to changing of the address information.

* * * * *